United States Patent
Juster (10) Patent No.: US 6,202,089 B1
(45) Date of Patent: Mar. 13, 2001

(54) METHOD FOR CONFIGURING AT RUNTIME, IDENTIFYING AND USING A PLURALITY OF REMOTE PROCEDURE CALL ENDPOINTS ON A SINGLE SERVER PROCESS

(75) Inventor: Doron Juster, Haifa (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/108,039

(22) Filed: Jun. 30, 1998

(51) Int. Cl.[7] ............................... G06F 15/16; G06F 9/00
(52) U.S. Cl. ......................... 709/219; 709/217; 709/330
(58) Field of Search .................................. 709/203, 217, 709/219, 201, 202, 330, 104; 712/225

(56) References Cited

U.S. PATENT DOCUMENTS

| | | |
|---|---|---|
| 4,584,679 | 4/1986 | Livingston et al. . |
| 4,623,886 | 11/1986 | Livingston . |
| 4,656,474 | 4/1987 | Mollier et al. . |
| 4,736,369 | 4/1988 | Barzilai et al. . |
| 4,769,815 | 9/1988 | Hinch et al. . |
| 5,063,562 | 11/1991 | Barzilai et al. . |
| 5,193,090 | 3/1993 | Filipiak et al. . |
| 5,247,676 * | 9/1993 | Ozur et al. ........................... 709/328 |
| 5,287,103 | 2/1994 | Kasprzyk et al. . |
| 5,367,523 | 11/1994 | Chang et al. . |
| 5,465,328 | 11/1995 | Dievendorff et al. . |
| 5,526,358 | 6/1996 | Gregerson et al. . |
| 5,526,489 | 6/1996 | Nilakantan et al. . |
| 5,546,391 | 8/1996 | Hochschild et al. . |
| 5,555,415 | 9/1996 | Allen . |
| 5,557,748 | 9/1996 | Norris . |
| 5,572,582 | 11/1996 | Riddle . |
| 5,627,766 | 5/1997 | Beaven . |
| 5,761,507 * | 6/1998 | Govett ................................. 709/101 |
| 5,764,625 | 6/1998 | Bournas . |
| 5,777,987 | 7/1998 | Adams et al. . |
| 5,778,384 | 7/1998 | Provino et al. . |
| 5,793,861 | 8/1998 | Haigh . |
| 5,812,819 | 9/1998 | Rodwin et al. . |
| 5,815,667 | 9/1998 | Chien et al. . |
| 5,819,042 | 10/1998 | Hansen . |
| 5,828,653 | 10/1998 | Goss . |
| 5,835,727 | 11/1998 | Wong et al. . |
| 5,838,907 | 11/1998 | Hansen . |

(List continued on next page.)

OTHER PUBLICATIONS

Schroeder et al., "Performance of Firefly RPC", ACM Transactions on Computer Systems, vol. 8, No. 1, pp. 1–17, Feb. 1990.*

(List continued on next page.)

*Primary Examiner*—Mark Rinehart
*Assistant Examiner*—Jason D. Cardone
(74) *Attorney, Agent, or Firm*—Leydig, Voit & Mayer, Ltd.

(57) ABSTRACT

An invention for assigning a plurality of remote procedure call (RPC) endpoints at runtime to a single server process, and for the server process itself to efficiently inform a requesting client of at least one of the plurality of the RPC endpoints is disclosed. In one embodiment, a single server process establishes a plurality of non-statically defined endpoints at runtime corresponding to various RPC services provided by the server process. In addition, the server process establishes another RPC endpoint for responding to RPC endpoint address queries from clients; this address query endpoint could either be predetermined or dynamically assigned at runtime. To acquire and use one of the plurality of endpoints of the server process assigned at runtime, a client first places a remote procedure call to the address request endpoint of the server process and includes a description of the desired service or endpoint. In response, the server process returns an identifier of one or more matching endpoints or services. Based on this identifier, the client then places a remote procedure call on the desired endpoint of the server process.

50 Claims, 7 Drawing Sheets

U.S. PATENT DOCUMENTS

| | | |
|---|---|---|
| 5,845,081 | 12/1998 | Rangarajan et al. . |
| 5,854,901 | 12/1998 | Cole et al. . |
| 5,864,669 * | 1/1999 | Osterman et al. ............. 709/203 |
| 5,872,968 | 2/1999 | Knox et al. . |
| 5,875,301 | 2/1999 | Duckwall et al. . |
| 5,875,306 | 2/1999 | Bereiter . |
| 5,878,056 | 3/1999 | Black et al. . |
| 5,881,051 | 3/1999 | Arrowood et al. . |
| 5,901,138 | 5/1999 | Bader et al. . |
| 5,920,697 | 7/1999 | Masters et al. . |
| 5,922,049 | 7/1999 | Radia et al. . |
| 5,930,479 | 7/1999 | Hall . |

OTHER PUBLICATIONS

Rolia et al., "Modeling RPC Performance", ACM Sigmetrics 94, pp. 282–283, Mar. 1994.*

Schuster et al., "Client/Server Qualities: A Basis for Reliable Distributed Workflow Management Systems", IEEE, pp. 186–193, May 1997.*

Covaci et al. "Mobile Intelligent Agents for the Management of the Information Infrastructure", IEEE, pp. 24–33, Jan. 1998.*

Lam, Richard B., "Shared Memory and Message Queues", *Dr. Dobb's Journal on CD–Rom*, Mar. 1995 p. 2–3.

Newton, Harry, *Newton's Telecomm Dictionary, $8^{th\ Ed}$*, Flatiron Publishing, 1994, pp. 333 and 870.

*Microsoft Message Queuing Services: A Guide to Reviewing Microsoft Message Queuing Service Release 1.0*, Microsoft Corporation, Redmond, Washington, 1997.

Comer, Douglas E., *Internetworking With TCP/IP vol.1: Principles, Protocols, and Architecture*, Chapter 6: Determining an Internet Address at Startup (RARP) and Chapter 18: Client–Server Model of Interaction, pp. 8—88, 293—309, Prentice–Hall, Englewood Cliffs, New Jersey, 1991.

Benaloh, Josh et al, *The Private Communication Techonology (PCT) Protocol*, Internet Draft, available from http://premium.microsoft.com/msdn/library/bkgrnd/html/pct/hml, Oct. 1995.

Marshall, Martin, "Microsoft Updates Falcon Beta", *Internetweek*, Issue 653, Mar. 10, 1997.

Bowen, Ted Smalley, "Asynchronous Messaging Pushes to the Fore", Infoworld, Feb. 23, 1998. Available from http://www.infoworld.com/cgi–bin/displayTC.pl?/980223sbl–async.htm.

Biggs, Maggie, "Applications Released from Platform Confines: Message Queuing Exchanges Data Between Apps Regardless of Platform", Infoworld, Feb. 23, 1998. Available from http://infoworld.com/cgi–bin/displayTC.pl?/980223analysis.htm.

*Using MSMQ as an RPC Transport*, Microsoft Corporation, 1997.

Tarjan, Robert Endre, *Data Structures and Network Algorithms*, Chapter 3: Heaps, pp. 33—43, Society for Industrial and Applied Mathematics, Philadelphia, Pennsylvania, 1993.

Microsoft Message Queue Server 1.0 Release Notes, Microsoft Corporation, Redmond Washington, 1997.

Microsoft Message Queue Server: A Guide to Reviewing and Evaluation Microsoft Message Queue Server Beta 2 Release, Microsoft Corporation, Redmond, Washington, 1997.

Richter, Jeffrey, *Advanced Windows: The Professional Developers Guide to the Win32 API for Windows NT 4.0 and Windows 95*, Chapter 11: Window Messsages and Asynchronous Input, pp. 461—528, Microsoft Press, Redmond Washington, 1997.

Sinha, Alok K., *Network Programming in Windows NT*, Chapter 5: Windows Sockets in Windows NT, pp. 199—299, Addison–Wesley Publishing Company, Reading, Massachusetts, 1996.

Gilman, Len and Schreiber, Richard, *Distributed Computing with IBM MQSeries*, John Wiley & Sons, New York, New York, 1997.

Blakeley, Burnie; Harris, Harry, and Lewis, Rhys, *Messaging & Queuing Using the MQI*, McGraw–Hill Inc., New York, New York, 1995.

* cited by examiner

METHOD FOR CONFIGURING AT RUNTIME, IDENTIFYING AND USING A PLURALITY OF REMOTE PROCEDURE CALL ENDPOINTS ON A SINGLE SERVER PROCESS

FIELD OF THE INVENTION

This invention relates to computer programming and networking, and more particularly to an automated method and computer apparatus for dynamically assigning a plurality of remote procedure call endpoints to a server process.

BACKGROUND OF THE INVENTION

Users of computers desire computer systems that require minimal manual interaction to perform systems management functions. Moreover, in this age of electronic communication, a large number of computers are connected to a network which allows them to practice numerous services over the network.

Many of these networked services are implemented using the client-server model. Using the client-server architecture, a client computer located on the network performs a remote procedure call (RPC) to a RPC endpoint of a server process running on a server computer to request information or initiate the performance of some activity. To be able to make such a call, the client must know a priori the correct endpoint of the server process.

In many configurations, the server process uses a predetermined "static" endpoint which either requires manual intervention on the part of the computer user to specify for the client, or is set by the developer of the client and server software. As the number of endpoints are limited for a computer, different programs can conflict with each other, and then require manual intervention to reconfigure the endpoints for the software to function properly. The static definition of the server ports also presents configuration problems when a server process is modified or moved to another computer as each of the clients might need to be manually reconfigured.

Attempting to overcome some of these deficiencies, "dynamic endpoints" are provided. The endpoint number of these dynamic endpoints are assigned at runtime by certain RPC runtime environments. A client process can then discover the address of the endpoint via the endpoint mapper (part of the RPC subsystem) and possibly in conjunction with a RPC Name Service. However, the RPC Name Service is a complex set of separate processes running on one or more computers that allows clients to determine a server location by specifying a logical name for that service and requires substantial initial configuration and maintenance.

The use of dynamic endpoints where the RPC endpoint is assigned at runtime overcomes some of the configuration and conflict problems associated with the use of static endpoints. However, certain RPC runtime systems only provide a mechanism for a single dynamic endpoint per server process which is very limiting to the design and efficiency of server processes.

In an environment that provides a RPC service that supports only a single RPC dynamic endpoint for a given process, statically defined endpoints are used to provide multiple endpoints to a single process, where the plurality of port numbers are previously known to the remote process. As previously described, current approaches do not provide a mechanism for the dynamic assignment of a plurality of RPC endpoints to a single server process at runtime, and for efficiently informing the client process of these endpoints.

SUMMARY OF THE INVENTION

According to the invention, an automated method is provided for assigning a plurality of remote procedure call (RPC) endpoints at runtime to a single server process, and for the server process itself to efficiently inform a requesting client of at least one of the plurality of the RPC endpoints. In one embodiment of the present invention, a single server process establishes a plurality of non-statically defined endpoints at runtime corresponding to various RPC services provided by the server process. Thus, the server process will have a plurality of RPC endpoints which do not conflict with other RPC applications. In addition, the server process establishes another RPC endpoint for responding to RPC endpoint address queries from clients; this address query endpoint could either be predetermined or dynamically assigned at runtime.

To acquire and use one of the plurality of endpoints of the server process assigned at runtime, a client first places a remote procedure call to the address request endpoint of the server process where the remote procedure call includes a description of the desired service or endpoint. In response, the server process returns an identifier of one or more matching endpoints or services. Based on this identifier, the client then places a remote procedure call on the desired endpoint of the server process.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

DETAILED DESCRIPTION OF THE PREFERRED EMBODIMENT

Figure 1A:
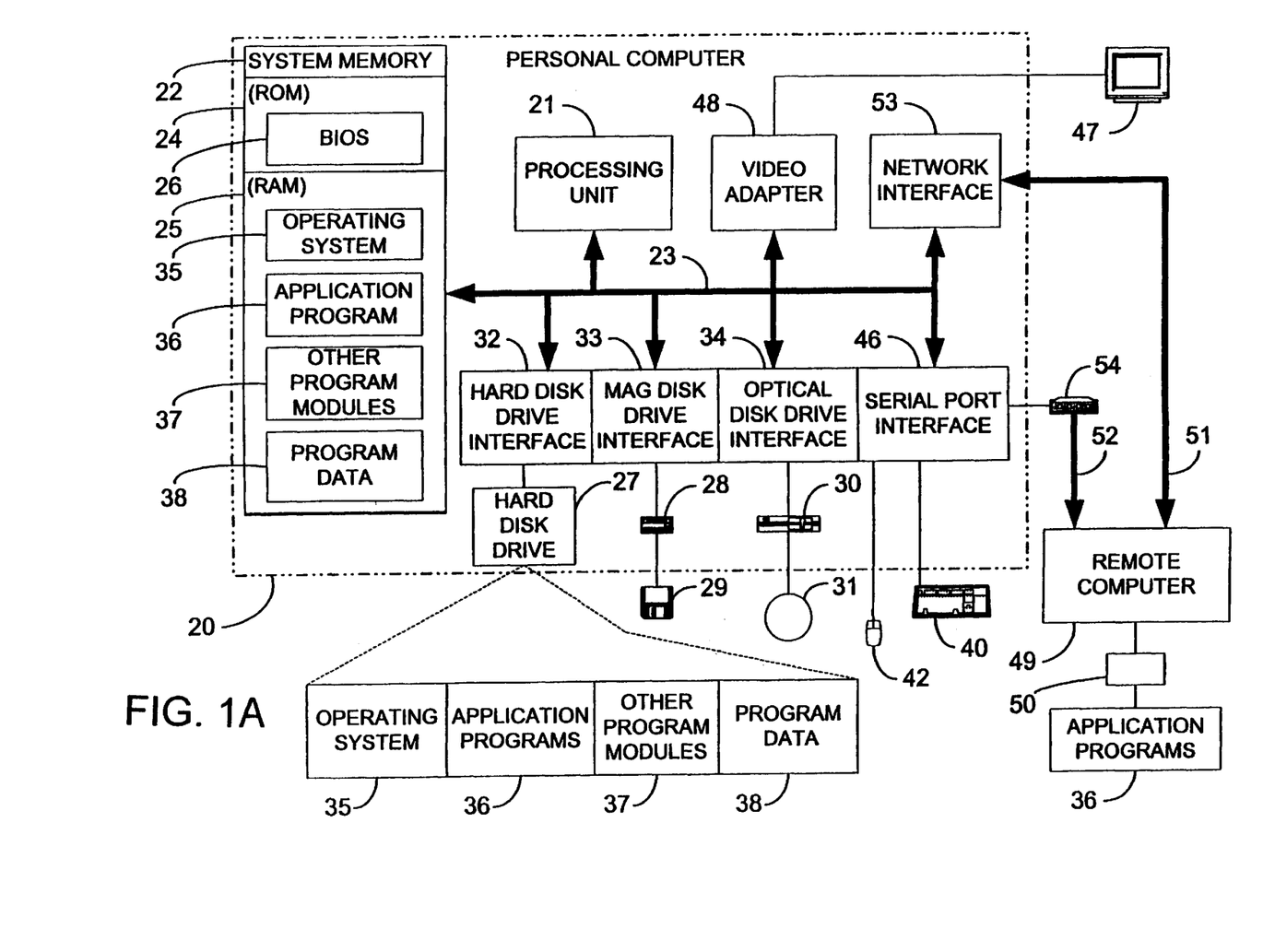
FIG. 1A is a block diagram of an exemplary operating environment in which the invention may be implemented, including a computer network comprising a server and client computer systems for assigning a plurality of remote procedure call (RPC) endpoints at runtime to a single server process, and for the server process itself to efficiently inform a requesting client of at least one of the plurality of the RPC endpoints in accordance with the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. In one embodiment of the present invention on a server computer 20 with a remote client computer 49, commands are stored in system memory 22 and are executed by processing unit 21 for defining a plurality of remote procedure call (RPC) service endpoints at runtime on a single server process; for defining a dynamic endpoint on the single server process for endpoint address queries; and for responding to endpoint address queries from clients. In another embodiment of the present invention on a client computer 20 with a remote server computer 49, commands are stored in system memory 22 and are executed by processing unit 21 for querying a server process via a remote procedure call (RPC) on its endpoint address query endpoint and for receiving the server reply. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

According to the present invention, a method is provided for configuring a plurality of currently non-used and non-statically defined RPC endpoints at runtime on a single server process and for informing a remote client process of the plurality of RPC endpoints. An endpoint address query endpoint is configured on the server process for receiving requests from clients for the address of at least one of the RPC service endpoints. Provided in the request is some criteria (e.g., an enumerator) for determining the identifier (e.g., an endpoint number) that the server process will return to the requesting process. The client then performs remote procedure calls on one or more of the identified endpoints of the server process.

The present invention operates in any computing environment that supports remote procedure calls, whether on a standalone computer or preferably in a networked environment. These operating environments include Win32 operating systems (e.g., Windows NT, Windows 95, Windows CE, and Windows 98). In addition, the present invention also operates in a Microsoft Message Queue Server environment (MSMQ). A brief introduction of message queuing is provided below. A more detailed explanation of MSMQ is described in "Microsoft Message Queue Server (MSMQ)," MSDN Library—April 1998, Microsoft Corporation, and is hereby incorporated by reference.

MSMQ implements asynchronous communications by enabling applications to send messages to, and receive messages from, other applications. These applications may be running on the same machine or on separate machines connected by a network. MSMQ messages can contain data in any format that is understood by both the sender and the receiver. When an application receives a request message, it processes the request by reading the contents of the message and acting accordingly. If required, the receiving application can send a response message back to the original requester.

While in transit between senders and receivers, MSMQ keeps messages in holding areas called queues, hence the name message queuing. MSMQ queues protect messages from being lost in transit and provide a place for receivers to look for messages when they are ready. Applications make requests by sending messages to queues associated with the intended receiver. If senders expect responses in return, they must include the name of a response queue (that the sender must create in advance) in all requests that they make to the receiver.

Figure 1B:
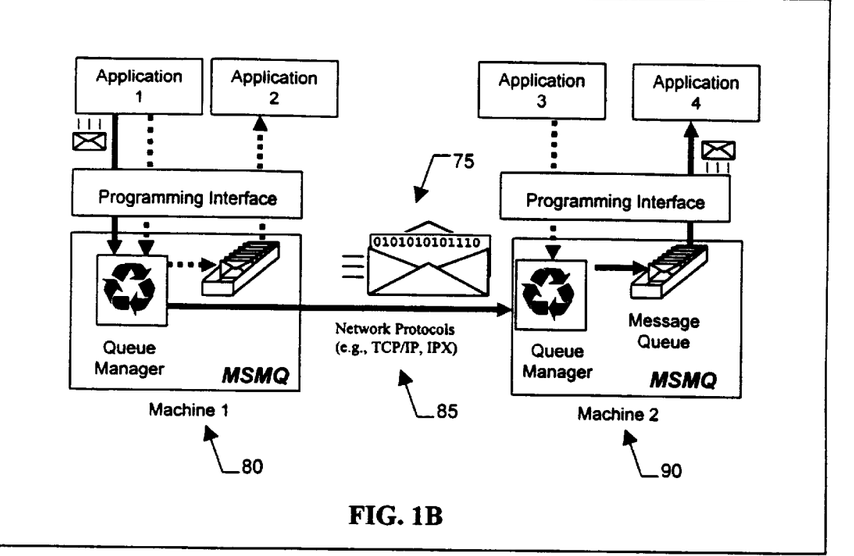
FIG. 1B is a block diagram illustrating the transmission of messages in a message queuing environment which advantageously uses a plurality of endpoints on a single message queuing server process.

Turing now to FIG. 1B, shown is a block diagram illustrating the basics of the transportation of a message 75 from message queuing machine 1 (computer 80) to machine 2 (computer 90) over a transport network 85 supporting such network transport protocols as TCP/IP or IPX. Each computer 80 and 90 perform both server and client operations for transferring messages 75 between their respective message queues.

In this Microsoft Message Queue Server environment, it is desirous for a message queuing server process to have multiple endpoints for different durations of RPC operations. One endpoint could be used for message queuing system management and other short-lived operations, and a second for longer operations like reading operations with an infinite timeout. Such a configuration will allow RPC cleanup operations on RPC context handles for the short-lived RPC request endpoints. Such cleanup operations cannot be performed on the infinite duration endpoints because they will have continuous pending calls.

Figure 2A:
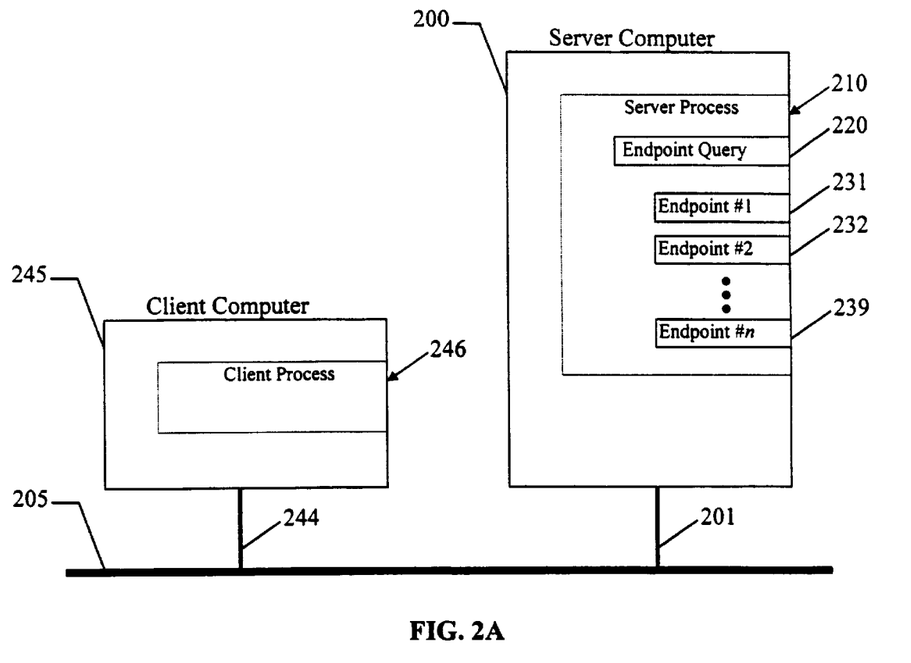
FIG. 2A is a block diagram of an exemplary network configuration comprising two interconnected computers practicing the present invention.

Turning now to FIG. 2A, shown is a block diagram of a networked client computer 245 and server computer 200 which will be used to describe one embodiment of the present invention in conjunction with flow diagrams presented in FIGS. 3A, 3B, 4 and 5. As shown, server computer 200 is connected via link 201 to a network 205 (such as a LAN or WAN) to which client computer 245 is connected via link 244. Network 205 can support numerous protocols (e.g., TCP/IP, IPX) as long as it provides a conduit for remote procedure calls between a client process 246 in the client 245 and a server process 210 operating in server 200.

Figure 3A:
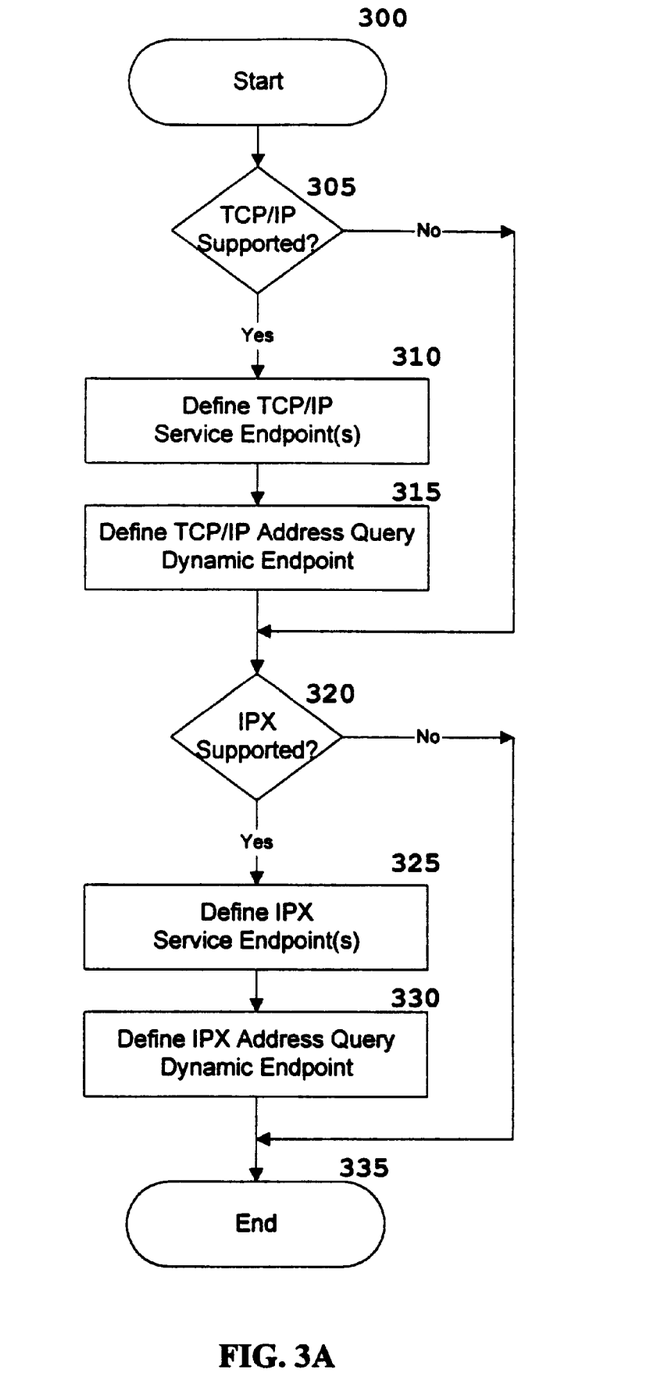
FIG. 3A is a high-level data flow diagram illustrating the steps performed in defining the plurality of RPC service endpoints and the endpoint address query endpoint at runtime.
Figure 3B:
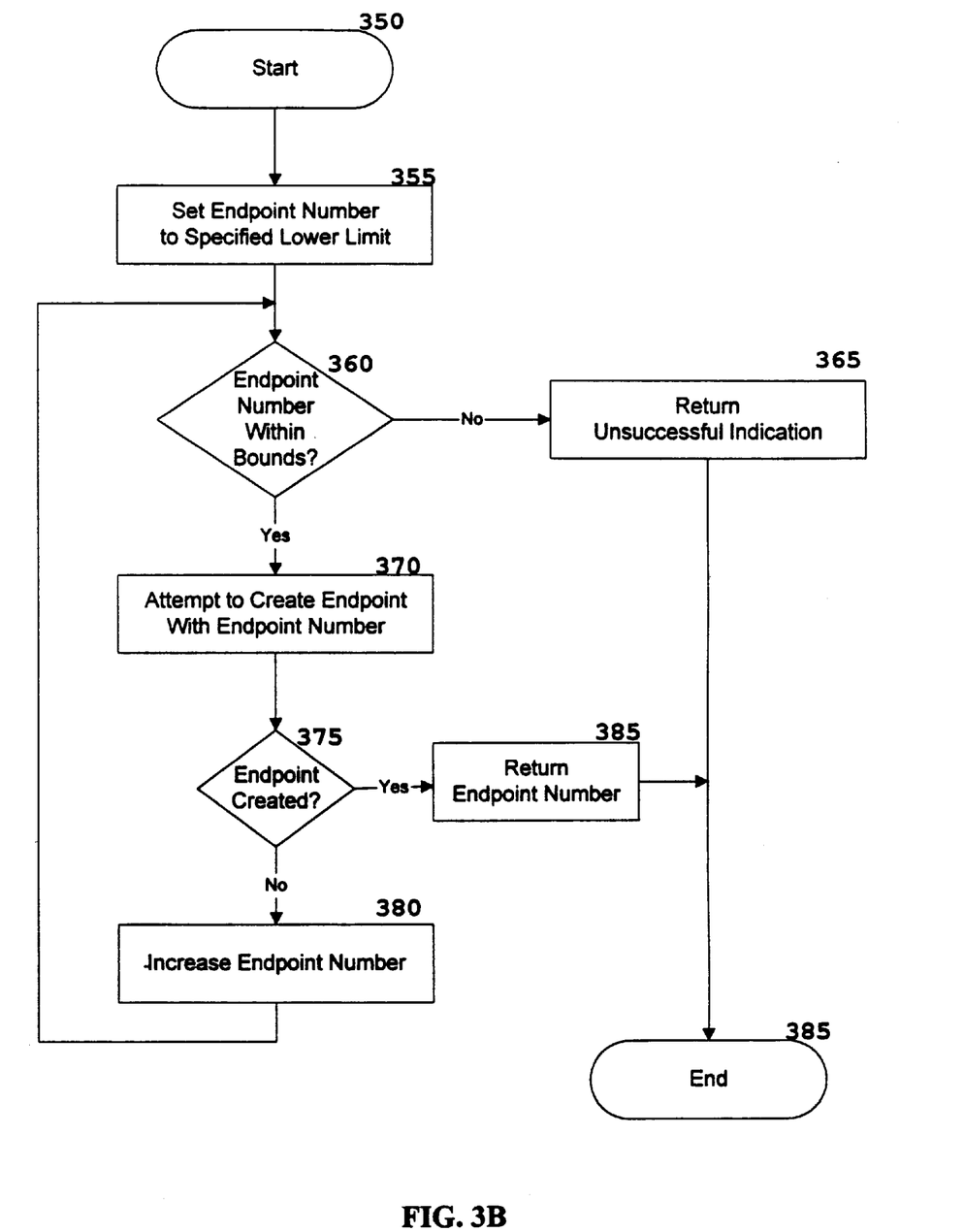
FIG. 3B is a data flow diagram illustrating one embodiment of the steps performed at runtime to determine a RPC endpoint to use.

Referring now to FIGS. 3A–B, presented are the steps performed to initialize the server process 210 (FIG. 2A) in accordance with the present invention. First, in step 305, server process 210 determines whether server 200 currently supports TCP/IP protocol, and if so, configures the TCP/IP RPC service endpoints in step 310.

Figure 2B:
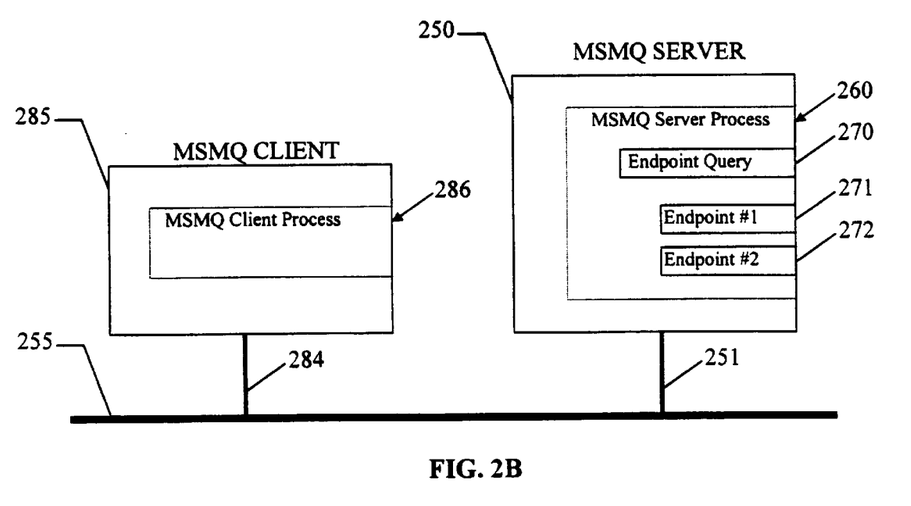
FIG. 2B is a block diagram illustrating a message queuing network comprising a MSMQ client and a MSMQ server having a plurality of dynamically assigned endpoints in accordance with the present invention.

The number of service endpoints desired for the server process 210 is application specific. Represented is FIG. 2A is the server process 210 having a single endpoint query RPC port 220 (multiple query endpoints could be used in other embodiments), and a number n service endpoints (231–239), where the value of n ranges from 1 to the number of RPC ports supported by server computer 200. In addition, FIG. 2B illustrates the present invention employed in a MSMQ queuing environment as previously described herein. FIG. 2B, mirroring the application-generic block diagram of FIG. 2A, includes a MSMQ client computer 285 having a MSMQ client process 286 and connected to a network 255 via link 284. Similarly, the MSMQ server 250 having server process 260 is connected to network 255 via link 251. In this example, MSMQ server process 270 has a single query endpoint 270, and two RPC service endpoints 271, 272.

In this application, the MSMQ server process 260 desires two service endpoints 271, 272. One endpoint 271 is used for message queuing system management and other short-lived operations, and the second endpoint 272 is used for longer operations like reading operations with an infinite timeout. The server process 260 also has an endpoint address query RPC endpoint 270 for receiving remote procedure calls from client process 286 specifying some criteria. Server process 260 then matches this criteria against its configuration and returns to the client process 286 an identifier (such as a RPC endpoint number) to the MSMQ client process 286 for the requested endpoint(s) 271, 272. The details of these operations are described hereinafter in regards to the application-generic architecture model of FIG. 2A in conjunction with the flow diagrams of FIGS. 3A, 3B, 4 and 5.

Returning to FIG. 3A and the processing of step 310, the desired service endpoints are configured at runtime. By configuring these endpoints at runtime, conflicts with other applications are minimized as the currently unused endpoints are preferably employed.

The steps performed in one embodiment for configuring each of the service endpoints is shown in FIG. 3B. First, in step 355, an endpoint number variable is set to a lower limit of the endpoint numbers available for use. The range of RPC endpoints available for use could be predetermined by a computer user or server software developer, for example.

Next, beginning in step 360, while the value of the endpoint number variable is within the predetermined bounds, an endpoint is attempted to be initialized in step 370. If this operation is successful as determined in step 375, then the RPC service endpoint has been created and its value is returned in step 385. Otherwise, in step 380, the endpoint number variable is increased by some small value (e.g., 1, 11) corresponding to the successive endpoints to check. Then processing continues back to step 360. If the value of the endpoint number exceeds its upper boundary, then an appropriate RPC service endpoint has not been created as indicated by step 365 which returns an unsuccessful code.

Returning to FIG. 3A and the processing of step 310, after each of each desired service endpoint has been created and configured at runtime, processing continues with step 315 wherein a RPC dynamic endpoint is created for receiving endpoint address queries. In other embodiments, a static port number could be used instead of a dynamic endpoint. Also, a naming service could be employed to associate and publish a logical name with the endpoint address query endpoint.

Next, initialization of the server process 210 (FIG. 2A) continues with creating and initializing the desired service and address query endpoints for each network protocol to be supported. Steps 320–330 illustrate the steps for IPX protocol whose functions correspond to that described in relation to steps 305–315 for TCP/IP protocol.

After all the endpoints have been created and configured, server process 210 has been initialized and is ready to respond to remote procedure calls. The steps performed by server process 210 to respond to requests for access to a type of RPC port is illustrated by the flow diagram of FIG. 4, with the corresponding operation of the client process 246 (FIG. 2A) illustrated in FIG. 5.

Figure 4:
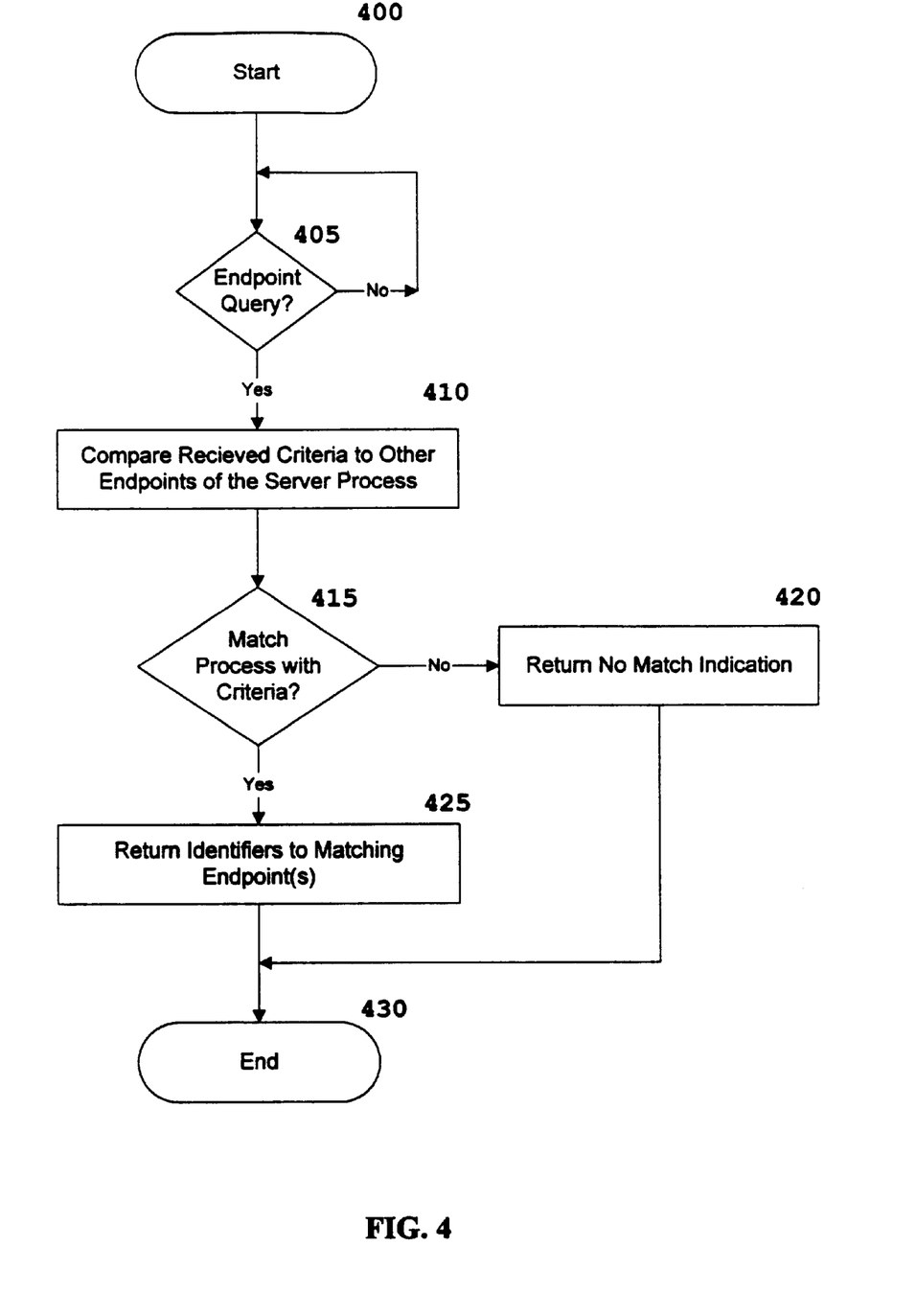
FIG. 4 is a flow diagram illustrating the steps performed by the server process in responding to an endpoint address query remote procedure call request from a client.

Turning to FIG. 4, the RPC address query thread of server process 210 is in a wait state until an endpoint address query is received on the address query endpoint 220 (FIG. 2A) as indicated by step 405. In response to such a query, step 410 is performed to compare the criteria received in the remote procedure call from the client process 246 with the services available using endpoints 231–239 of the server process 210. The server process then determines one or more RPC service endpoints 231–239 that match this criteria. In one embodiment, the criteria is an enumerator identifying the type of endpoint desired. In other embodiments, an integer, string of text, service characteristic, or other identification criteria could be compared against a database of RPC service descriptors. If the received criteria is matched to a RPC service endpoint (step 415), an identifier is returned to the calling RPC process (e.g., client process 246) in step 425. Otherwise an indication of no match is returned in step 420. In one embodiment, the identifier is a RPC endpoint number of the server computer 200. As would be apparent to one skilled in the art, numerous other criteria and identifiers could be employed in various embodiments possible in keeping with the scope and spirit of the present invention.

Figure 5:
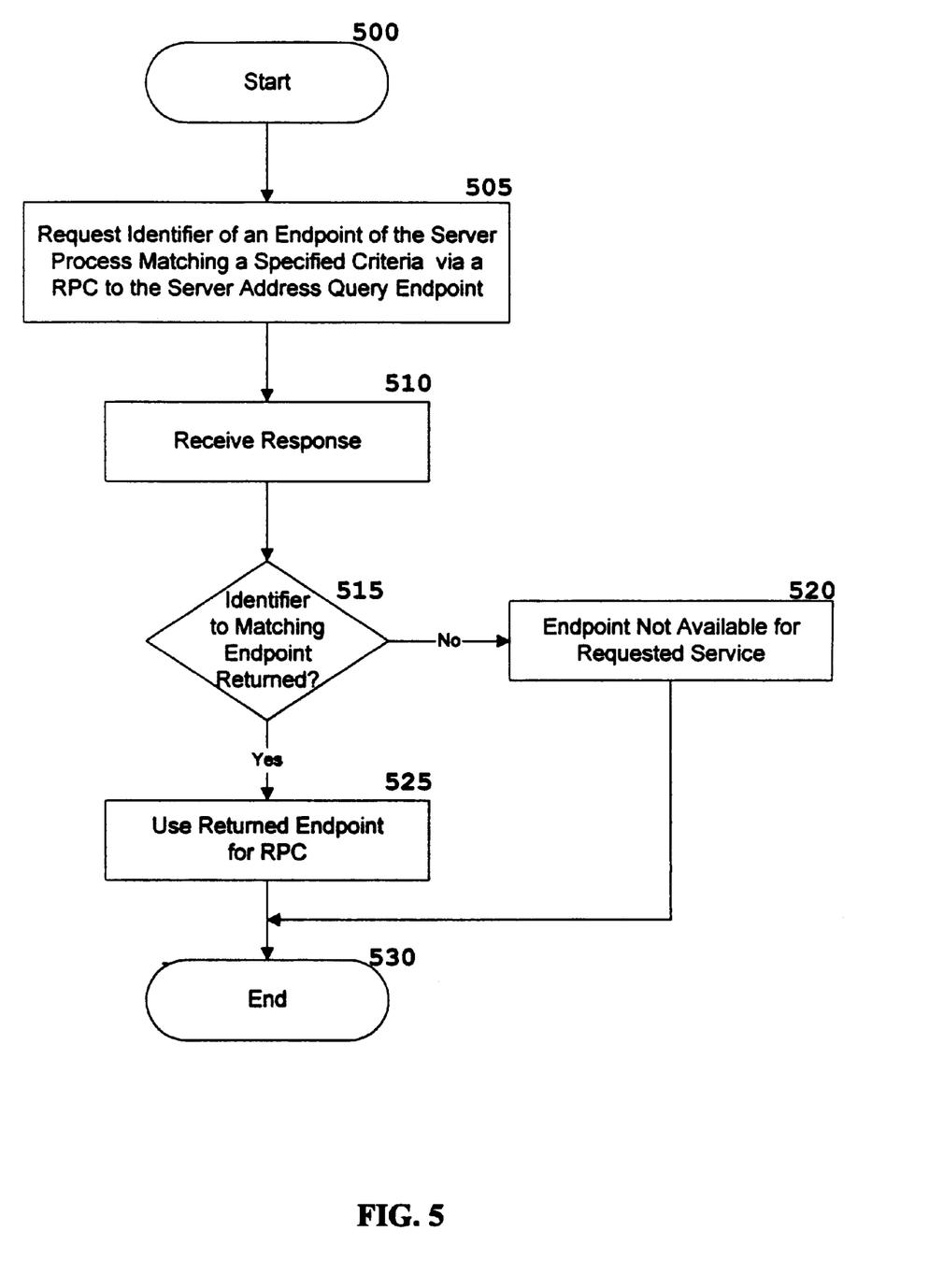
FIG. 5 is a flow diagram illustrating the steps performed by a client process in performing an endpoint address query remote procedure call to a server in accordance with the present invention.

Turning to FIG. 5 with reference to the block diagram of FIG. 2A, shown are the steps performed by the client process 246 to query the server process 210 for the desired RPC service endpoint. First, in step 505, a RPC call is made to the address query endpoint 220 which includes some criteria with which the server process 210 will use to return identifiers to one or more matching service endpoints 231 . 239. Once the response is received in step 510, if an identifier of a matching server endpoint was received as determined in step 515, the corresponding service endpoint 231 . 239 has been identified, can be used for remote procedure calls, and is returned to the calling client process 246 in step 525. Otherwise, a matching endpoint is not available, and such a notification is returned to the calling client process 246 in step 520.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. In a networked computer system, a method for a server process to provide a plurality of non-statically defined endpoints for remote procedure calls to a client, the method comprising the steps of: the computer system defining the plurality of endpoints of the server process at runtime; the computer system defining a query endpoint for receiving a remote procedure call (RPC) request to inform the client of at least one of the plurality of endpoints; the server process receiving an RPC from the client at the query endpoint requesting access to at least one of the plurality of endpoints, wherein the RPC includes a description of the type of service required by the client, and; the server process responding to the request by providing an identifier for at least one of the plurality of endpoints.

2. The method of claim 1, wherein the step of defining the plurality of endpoints is performed by the server process.

3. The method of claim 2, wherein the plurality of endpoints are selected by the server process at runtime.

4. The method of claim 1, wherein the query endpoint is a RPC dynamic endpoint.

5. The method of claim 1, wherein the computer system provides only a single dynamic endpoint per computer process.

6. The method of claim 1, wherein the at least one of the plurality of endpoints identified by the server process is not published in a name service.

7. The method of claim 1, further comprising the steps of: the client receiving the identifier for at least one of the plurality of endpoints; and the client performing a remote procedure call using the received identifier.

8. The method of claim 1, wherein the server process and client are part of a message queuing network.

9. The method of claim 1, wherein the description includes an enumerator identifying the type of service required by the client.

10. The method of claim 1, wherein the description includes an integer identifying the type of service required by the client.

11. The method of claim 1, wherein the description includes a string of text identifying the type of service required by the client.

12. The method of claim 1, wherein the description includes a service characteristic identifying the type of service required by the client.

13. In a networked computer system, a method for a client process to identify a previously unknown and unpublished remote procedure call (RPC) service endpoint of a server process, the method comprising the steps of: the server process receiving an RPC at a query endpoint from the client process, wherein the RPC includes a description of the type of remote procedure call service desired by the client; and the server process identifying the RPC service endpoint corresponding to the desired type of service to the client process.

14. The method of claim 13, further comprising the step of the server process assigning a plurality of endpoints to the server process at runtime.

15. The method of claim 14, wherein the identified RPC service endpoint is one of the plurality of endpoints assigned at runtime, and further comprising the step of the client process performing a remote procedure call on the identified RPC service endpoint.

16. The method of claim 13, further comprising the step of the client process performing a remote procedure call on the identified RPC service endpoint.

17. The method of claim 13, wherein the description includes an enumerator identifying the type of service required by the client.

18. The method of claim 13, wherein the description includes an integer identifying the type of service required by the client.

19. The method of claim 13, wherein the description includes a string of text identifying the type of service required by the client.

20. The method of claim 13, wherein the description includes a service characteristic identifying the type of service required by the client.

21. A computer-readable medium having computer-executable instructions for performing steps for a server process to provide a plurality of non-statically defined endpoints for remote procedure calls to a client, the steps comprising: the computer system defining the plurality of endpoints of the server process at runtime; the computer system defining a query endpoint for receiving a remote procedure call (RPC) request to inform the client of at least one of the plurality of endpoints; the server process receiving an RPC from the client at the query endpoint requesting access to at least one of the plurality of endpoints, wherein the RPC includes a description of the type of service required by the client, and; the server process responding to the request by providing an identifier for at least one of the plurality endpoints.

22. The computer-readable medium of claim 21, wherein the step of defining the plurality of endpoints is performed by the server process.

23. The computer-readable medium of claim 22, wherein the plurality of endpoints are selected by the server process at runtime.

24. The computer-readable medium of claim 21, wherein the query endpoint is a RPC dynamic endpoint.

25. The computer-readable medium of claim 21, wherein the computer system provides only a single dynamic endpoint per computer process.

26. The computer-readable medium of claim 21, wherein the at least one of the plurality of endpoints identified by the server process is not published in a name service.

27. The computer-readable medium of claim 21 having further computer-executable instructions for performing the steps of: the client receiving the identifier for at least one of the plurality of endpoints; and the client performing a remote procedure call using the received identifier.

28. The computer-readable medium of claim 21, wherein the server process and client are part of a message queuing network.

29. A computer-readable medium having computer-executable instructions for performing steps for a client process to identify a previously unknown and unpublished remote procedure call (RPC) service endpoint of a server process in a networked computer system, the steps comprising: the server process receiving an RPC on a query endpoint from the client process, wherein the RPC includes a description of the type of remote procedure call service desired by the client; and the server process identifying the RPC service endpoint corresponding to the desired type of service to the client process.

30. The computer-readable medium of claim 29, further comprising the step of the server process assigning a plurality of endpoints to the server process at runtime.

31. The computer-readable medium of claim 30, wherein the identified RPC service endpoint is one of the plurality of endpoints assigned at runtime, and having further computer-executable instructions for performing the step of the client process performing a remote procedure call on the identified RPC service endpoint.

32. The computer-readable medium of claim 29, further comprising the step of the client process performing a remote procedure call on the identified RPC service endpoint.

33. In a computer network, a method for a client to perform a remote procedure call on a server computer on a service endpoint associated with a server process without knowing beforehand the service endpoint, the method comprising the steps of: the client performing a remote procedure call (RPC) to a query endpoint of the server computer, wherein the RPC includes a criteria for the type of service required by the client; the client receiving the identifier of the service endpoint from the server computer, wherein the service endpoint matches the criteria; and the client computer performing a remote procedure call on the service endpoint.

34. The method of claim 33, wherein the criteria is an enumerator identifying the type of service desired by the client.

35. The method of claim 33, wherein the criteria is an integer identifying the type of service desired by the client.

36. The method of claim 33, wherein the criteria is a string of text identifying the type of service required by the client.

37. The method of claim 33, wherein the criteria is a service characteristic identifying the type of service required by the client.

38. In a message queuing computer system, a method for a client process on a message queuing client computer to perform remote procedure calls (RPC) to a server process on a message queuing server computer, the method comprising the steps of: the server process defining a dynamic endpoint for receiving RPC inquires from the client process; the server process defining a plurality of fixed RPC endpoints based from those currently unused on the message queuing server computer; the message queuing client computer performing a RPC call on the dynamic endpoint, wherein the RPC includes a criteria for the type of service required by the client; the server process receiving the client RPC call on the dynamic endpoint and selecting a matching endpoint from the plurality of fixed RPC endpoints based on the provided criteria; the server process returning an identification of the matching endpoint; and the message queuing client computer performing a remote procedure call to the matching endpoint based on the received identification.

39. The method of claim 38, wherein the criteria is an enumerator identifying the type of service desired by the client.

40. The method of claim 38, wherein the criteria is an integer identifying the type of service desired by the client.

41. The method of claim 38, wherein the criteria is a string of text identifying the type of service required by the client.

42. The method of claim 38, wherein the criteria is a service characteristic identifying the type of service required by the client.

43. In a networked computer system, a method for a client process on a client computer to perform remote procedure calls (RPC) to a server process on a server computer, the method comprising the steps of: the server process defining a dynamic endpoint for receiving RPC inquires from the client process; the server process defining a plurality of fixed RPC endpoints based from those currently unused on the server computer; the client computer performing a RPC call on the dynamic endpoint, wherein the RPC includes a criteria for the type of service required by the client; the server process receiving the client RPC call on the dynamic endpoint and selecting a matching endpoint from the plurality of fixed RPC endpoints based on the provided criteria; the server process returning an identification of the matching endpoint; and the client computer performing a remote procedure call to the matching endpoint based on the received identification.

44. The method of claim 43, wherein the criteria is an enumerator identifying the type of service desired by the client.

45. The method of claim 43, wherein the criteria is an integer identifying the type of service desired by the client.

46. The method of claim 43, wherein the criteria is a string of text identifying the type of service required by the client.

47. The method of claim 43, wherein the criteria is a service characteristic identifying the type of service required by the client.

48. A computer-readable medium having computer-executable instructions for performing steps for a client to perform a remote procedure call on a server computer on a service endpoint associated with a server process without knowing beforehand the service endpoint in a networked computer system, the steps comprising: the client performing a remote procedure call (RPC) to a query endpoint of the server computer, wherein the RPC includes a criteria for the type of service required by the client; the client receiving the identifier of the service endpoint from the server computer, wherein the service endpoint matches the criteria; and the client computer performing a remote procedure call on the service endpoint.

49. A computer-readable medium having computer-executable instructions for performing steps for a client process on a client computer to perform remote procedure calls (RPC) to a server process on a server computer in a networked computer system, the steps comprising: the server process defining a dynamic endpoint for receiving RPC inquires from the client process; the server process defining a plurality of fixed RPC endpoints based from those currently unused on the server computer; the client computer performing a RPC call on the dynamic endpoint, wherein the RPC includes a criteria for the type of service required by the client; the server process receiving the client RPC call on the dynamic endpoint and selecting a matching endpoint from the plurality of fixed RPC endpoints based on the provided criteria; the server process returning an identification of the matching endpoint; and the client computer performing a remote procedure call to the matching endpoint based on the received identification.

50. A computer-readable medium having computer-executable instructions for performing steps for a client process on a message queuing client computer to perform remote procedure calls (RPC) to a server process on a message queuing server computer in a message queuing computer system, the method comprising the steps of: the server process defining a dynamic endpoint for receiving RPC inquires from the client process; the server process defining a plurality of fixed RPC endpoints based from those currently unused on the message queuing server computer; the message queuing client computer performing a RPC call on the dynamic endpoint, wherein the RPC includes a criteria for the type of service required by the client; the server process receiving the client RPC call on the dynamic endpoint and selecting a matching endpoint from the plurality of fixed RPC endpoints based on the provided criteria; the server process returning an identification of the matching endpoint; and the message queuing client computer performing a remote procedure call to the matching endpoint based on the received identification.

* * * * *

UNITED STATES PATENT AND TRADEMARK OFFICE
CERTIFICATE OF CORRECTION

PATENT NO. : 6,202,089 B1
DATED : March 13, 2001
INVENTOR(S) : Doron Juster It is certified that error appears in the above-identified patent and that said Letters Patent is hereby corrected as shown below:

<u>Title page,</u>
Item [56], OTHER PUBLICATIONS, "Comer, Douglas, E.," reference, "pp. 8-88" should read -- pp. 83-88 --.

Signed and Sealed this

First Day of July, 2003

JAMES E. ROGAN
*Director of the United States Patent and Trademark Office*